Patented Apr. 12, 1927.

1,623,985

UNITED STATES PATENT OFFICE.

MAXIMILIAN E. VON MACH, JR., OF DETROIT, MICHIGAN.

CONCRETE-BLOCK COMPOSITION.

No Drawing.    Application filed April 13, 1922.   Serial No. 552,312.

This invention relates to a composition of matter for building and structural purposes.

The object of the invention is to produce a material for the manufacture of building blocks which will possess great strength, which will be fireproof and soundproof, which will hold nails, which may be easily sawed and which will be lighter in weight than concrete blocks or gypsum blocks.

The composition consists of the following ingredients: cinders or ashes, cement, shavings or sawdust, hydrated lime, and plaster of Paris. The cinders or ashes will be crushed if necessary and screened so that the largest pieces will not exceed about a quarter of an inch in diameter. All of the ashes may be used, but in certain cases to prevent efflorescence, the soluble parts may be washed out by soaking the ashes in water until the bulk of the soluble material present has been dissolved, and in cases where the cinders contain sulphur in combination, sulphuric or hydrochloric acids may be added to the water in sufficient quantity to dissociate the sulphides.

Ordinarily this washing and acid treatment will not be necessary and the entire residue from the combustion of coal may be used. By the term cement it is intended to include any ordinary form of Portland cement or hydraulic cement used in the manufacture of concrete.

The sawdust or shavings will preferably be free from large pieces of wood. Any finely divided wood resulting from various wood-working operations may be used in place of sawdust, and where shavings are used they will preferably be crushed or shredded into fine pieces.

In addition to the ingredients named, various other loose and light materials may be used as fillers, such as chalk, magnesia or asbestos.

The proportions may of course be varied within comparatively wide limits with corresponding variation in the qualities of the material, but the preferred proportions are approximately as follows by bulk: cinders or ashes, four parts, cement one part, sawdust or shavings one part, hydrated lime two parts, and plaster of Paris six parts.

A modification comprises the preceding mixture to which one part of asbestos is added.

A building block formed of the ingredients specified in the proportions just stated does not soften with moisture, is less brittle than a gypsum block, is lighter than a concrete block, and lighter than the so-called cinder cement block. It can easily be sawed and will not crack when nails are driven into it, but will hold the nails securely. It is fireproof and soundproof and forms an excellent material for interior partitions.

Blocks consisting of cement with cinders or ashes have hitherto been proposed, but they are relatively expensive and heavy. The addition of sawdust does not materially decrease their fireproof qualities and the addition of lime and plaster of Paris makes the block lighter, diminishes its cost and makes possible the sawing of the block. The further addition of chalk, magnesia or asbestos, will yield a block less dense than one having a higher percentage of cement and for certain purposes this addition may be made without sacrificing the other desirable qualities of the product.

I claim:—

The process of forming a composition of matter which consists in subjecting residue of burned fuel to the action of a mineral acid to remove sulphides, washing the residue of burned fuel to remove the soluble matter and mixing the remaining portion of residue with cement, finely divided wood, lime and plaster of Paris.

In testimony whereof I affix my signature.

MAXIMILIAN E. VON MACH, JR.